J. Gore,
Tanning Apparatus,
Nº 24,457.    Patented June 21, 1859.
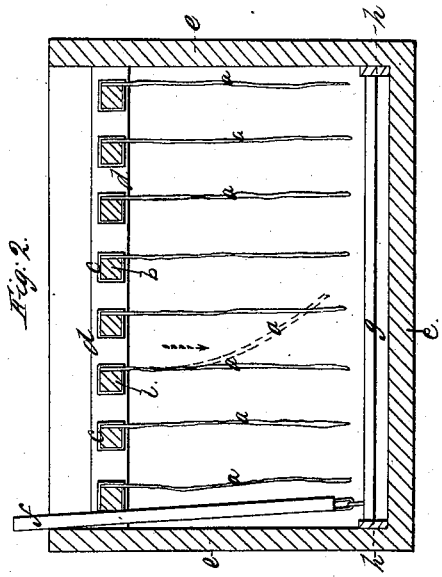
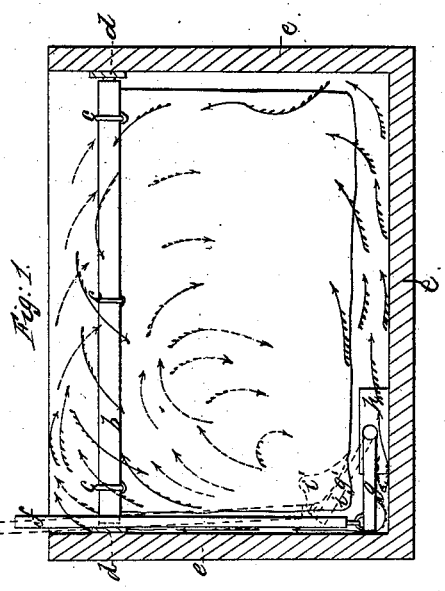
Witnesses:
Bainbridge Walleigh
A. J. Baldwin.
Inventor:
Jacob Gore

UNITED STATES PATENT OFFICE.

JACOB GOVE, OF MILFORD, NEW HAMPSHIRE.

TANNING.

Specification of Letters Patent No. 24,457, dated June 21, 1859.

*To all whom it may concern:*

Be it known that I, JACOB GOVE, of Milford, in the county of Hillsboro and State of New Hampshire, have invented an Improved Mode of Stirring Liquors in the Process of Tanning or Curing Hides; and I do hereby declare that the following is a full and exact description of its nature and operation, reference being had to the accompanying drawings and the letters of reference marked thereon, so as to enable others skilled in the art to make and use my invention.

Figure 1 of the drawings represents a cross section and Fig. 2 a longitudinal section through the vat containing the hides.

*a, a, a*, represent the hides which are fastened to, and suspended from crossbars *b, b, b*, by means of cords *c* or any other suitable means; the crossbars *b*, are arranged in the tanning vat *e, e, e*, so that the bars and hides will be completely immersed when the vat has been filled with tanning liquor.

The nature of my invention consists of an apparatus for stirring the liquor in the tanning vat, hereafter to be described, and arranged, so that the top of the vat will be left entirely unobstructed for the purpose of allowing the hides to be freely handled, and the vat to be covered or boarded over if desired; while at the same time the liquor shall be stirred from the bottom of the vat, where the stronger liquor settles; which of course needs stirring most. These objects and advantages are obtained by pivoting the stirring board *g*, at *h, h*, near the bottom of the vat, and attaching to it a handle *f*, which extends above the surface of the liquor. By working this handle up and down, the stirring board will be vibrated on its pivots, and thus keep the liquor in constant motion. While the board is being elevated, the motion of the liquor, will be such as indicated by red arrows. While the board is being depressed, the liquor will follow the direction indicated by the black arrows; thus effectually stirring the portion of the liquor which is near the bottom of the vat, and causing it to rise and operate upon the hides. The motion of the liquor being from below upward has a tendency to swing the hides backward and forward, as indicated by dotted lines in Fig. 2. When the hides are thus inclined to one or the other side, the liquor moving downward, as indicated by the arrow in Fig. 2, will operate effectually upon the sides of the hides, and wash them thoroughly; thus causing the tanning liquid to completely penetrate and saturate the hides. It will also be observed that a portion of the liquor is caused to rise up at the end of the vat, at each downward motion of the stirring board as indicated by part of the black arrows.

Having described my invention, what I claim therein as new and desire to secure by Letters Patent, is:—

Stirring the liquor or tanning fluid in the vat, by means of a stirrer constructed, arranged, and operated, substantially in the manner above set forth.

JACOB GOVE.

Witnesses:
BAINBRIDGE WADLEIGH,
A. J. BALDWIN.